United States Patent [19]

Heitzmann

[11] Patent Number: 5,465,997
[45] Date of Patent: Nov. 14, 1995

[54] RUBBER SPRING TAG AXLE SUPENSION

[75] Inventor: David E. Heitzmann, Union, Mich.

[73] Assignee: MOR/ryde International, Inc., Elkhart, Ind.

[21] Appl. No.: 204,681

[22] Filed: Mar. 2, 1994

[51] Int. Cl.[6] .......................... B60G 11/24; B60G 11/22
[52] U.S. Cl. .......................... 280/716; 267/257; 267/294
[58] Field of Search .................................. 280/716, 717, 280/687, 681, 725, 713, 715, 688; 267/257, 292, 294

[56] References Cited

U.S. PATENT DOCUMENTS

| | | | |
|---|---|---|---|
| 2,706,113 | 4/1955 | Hickman | 280/717 |
| 3,069,149 | 12/1962 | Neff | 280/715 |
| 3,120,952 | 2/1964 | Hendrickson | 280/716 |
| 3,482,852 | 12/1969 | Hickman | 280/717 |
| 3,495,848 | 2/1970 | Hickman | 280/717 |
| 3,547,215 | 12/1970 | Bird | 280/713 |
| 3,994,512 | 11/1976 | Parker et al. | 280/687 |
| 4,213,633 | 7/1980 | Moore | 280/716 |
| 4,465,298 | 8/1984 | Raidel, Sr. | 280/713 |
| 4,902,035 | 2/1990 | Raidel | 280/713 |
| 4,995,636 | 2/1991 | Hall et al. | 280/716 |
| 5,150,918 | 9/1992 | Heitzmann | 280/716 |

FOREIGN PATENT DOCUMENTS 2846608  5/1979  Germany .......................... 280/716

OTHER PUBLICATIONS

Publ. "Hexagonal Rubber Suspension Axles by Al–Ko Kober" Al–Ko Kober Corp., Elkhart, Ind., Three pages.
Publ. "Ridewell Presents the Most Advanced Trailing Axle Air Ride Suspension" Ridewell Corp., Springfield, Mo., Three pages.
Publ. "Air Suspensions" Dyneer, Granning Div., Livonia, Mich, Four pages.

Primary Examiner—Margaret A. Focarino
Assistant Examiner—Peter C. English
Attorney, Agent, or Firm—Joseph P. Gastel

[57] ABSTRACT

A tag axle assembly including spaced front hanger assemblies for attachment to spaced frame portions of a vehicle, spaced rearwardly extending beam assemblies pivotally mounted on the spaced hanger assemblies, spaced rear hanger assemblies attached to the spaced frame portions of the vehicle, spaced rubber springs attached between the spaced rear hanger assemblies and the rear of the spaced beam assemblies, an axle mounted between the spaced beam assemblies, first and second cross members extending between spaced portions of the vehicle frame, a third cross member extending between portions of the spaced rear hanger assemblies on opposite sides of the vehicle, and spaced plates secured to the spaced frame portions for preventing excess upward movement of the beam assemblies in the event of malfunction of the rubber springs.

25 Claims, 6 Drawing Sheets

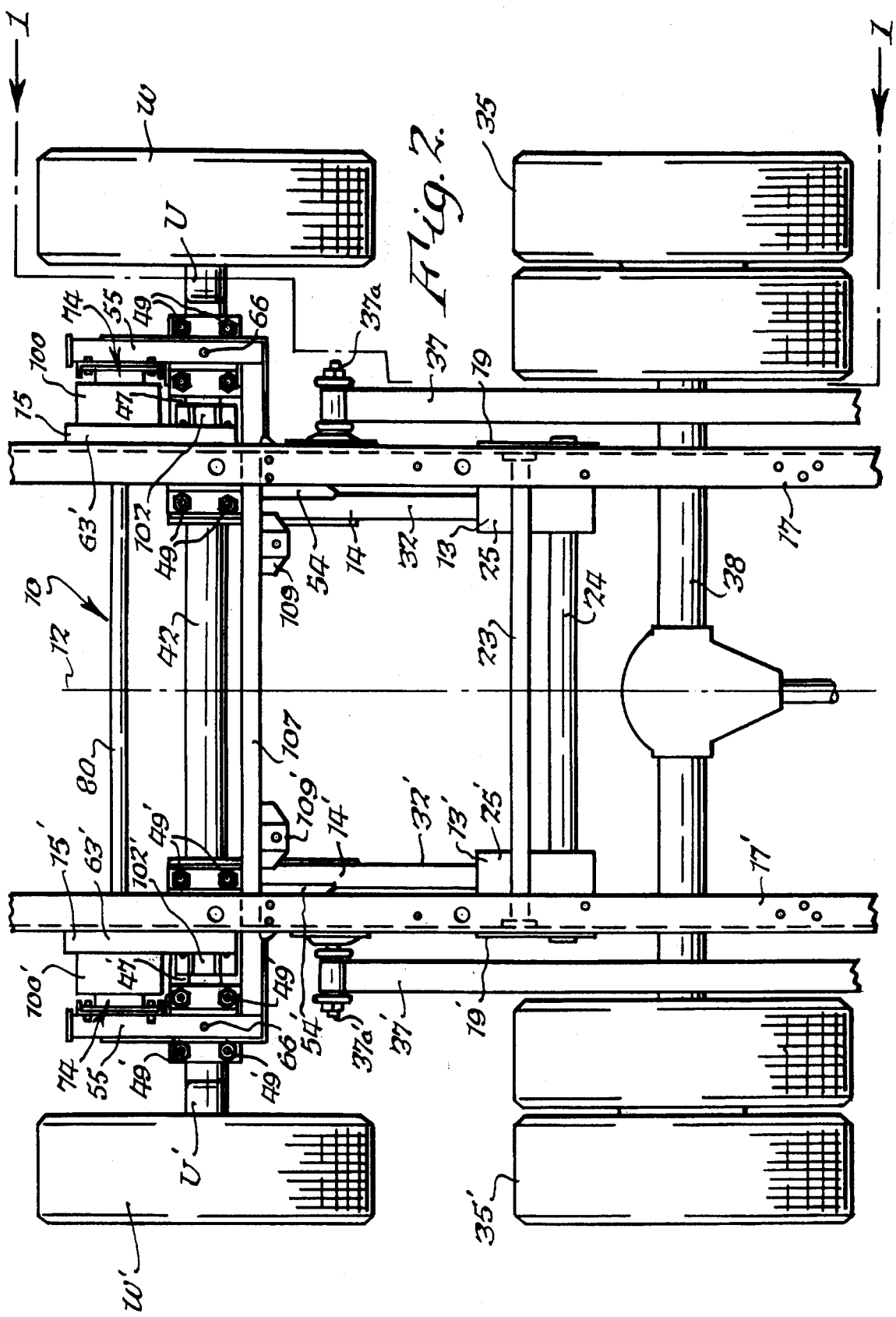

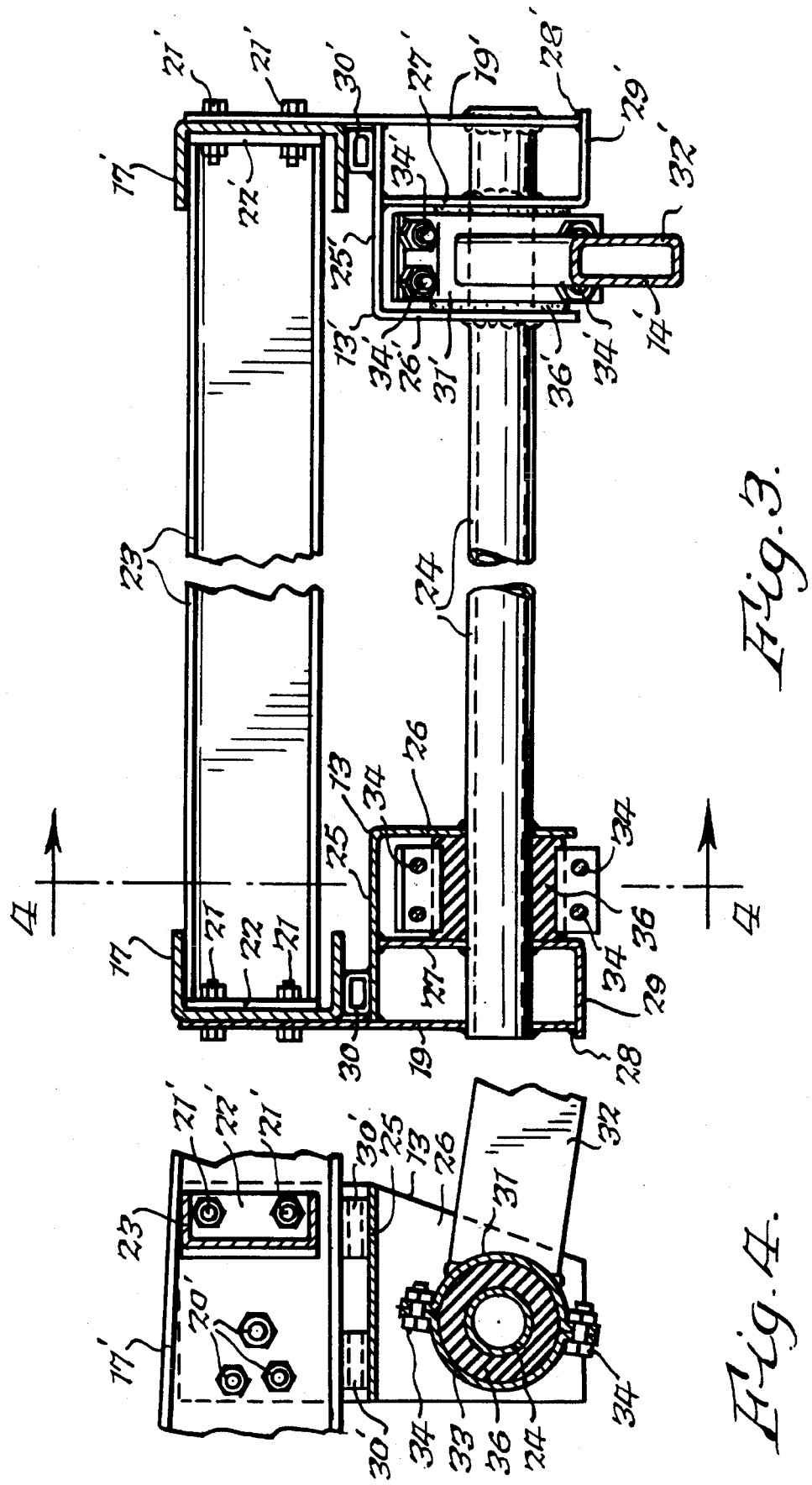

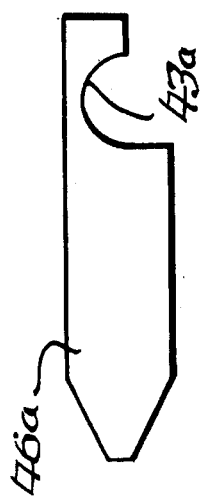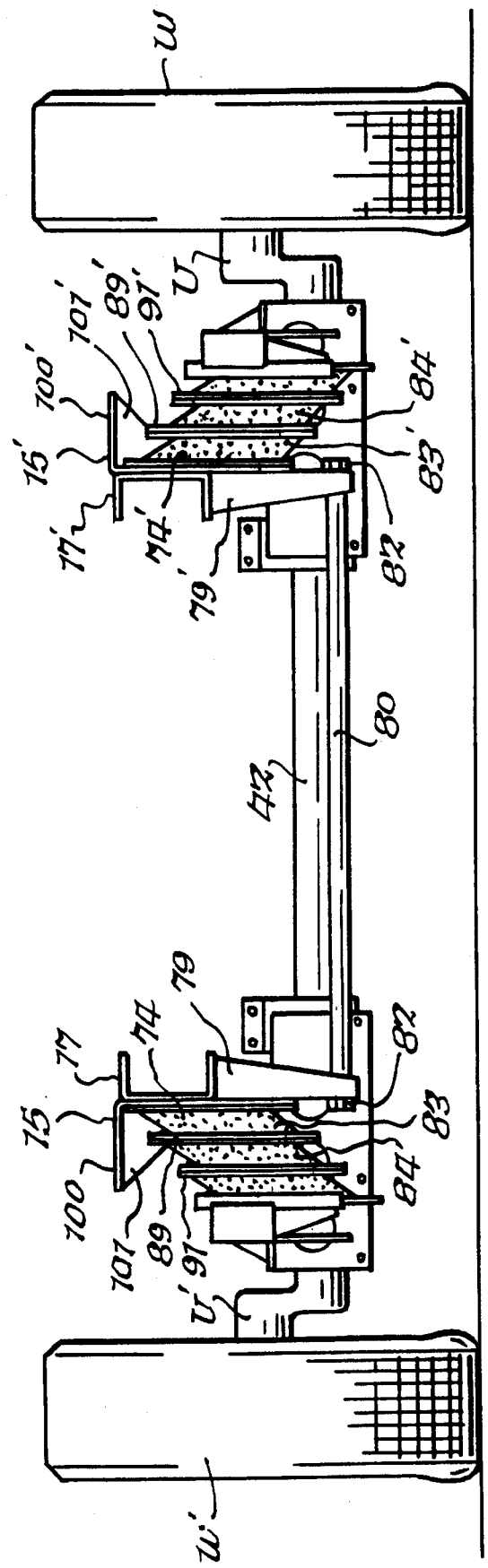

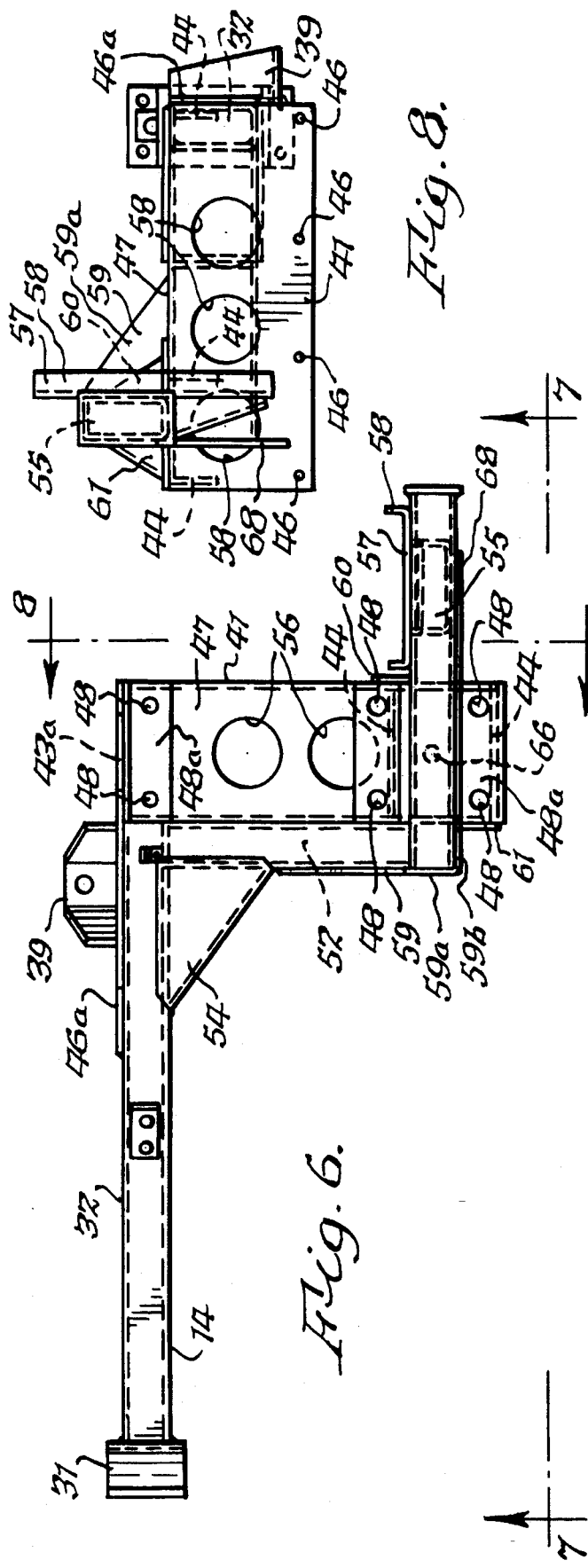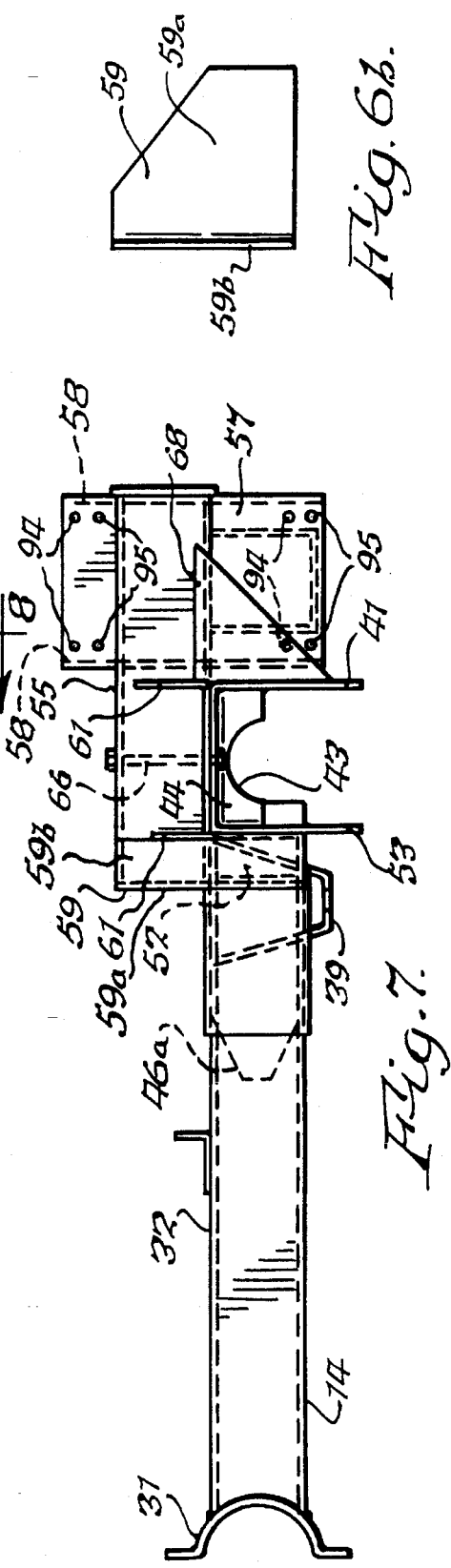

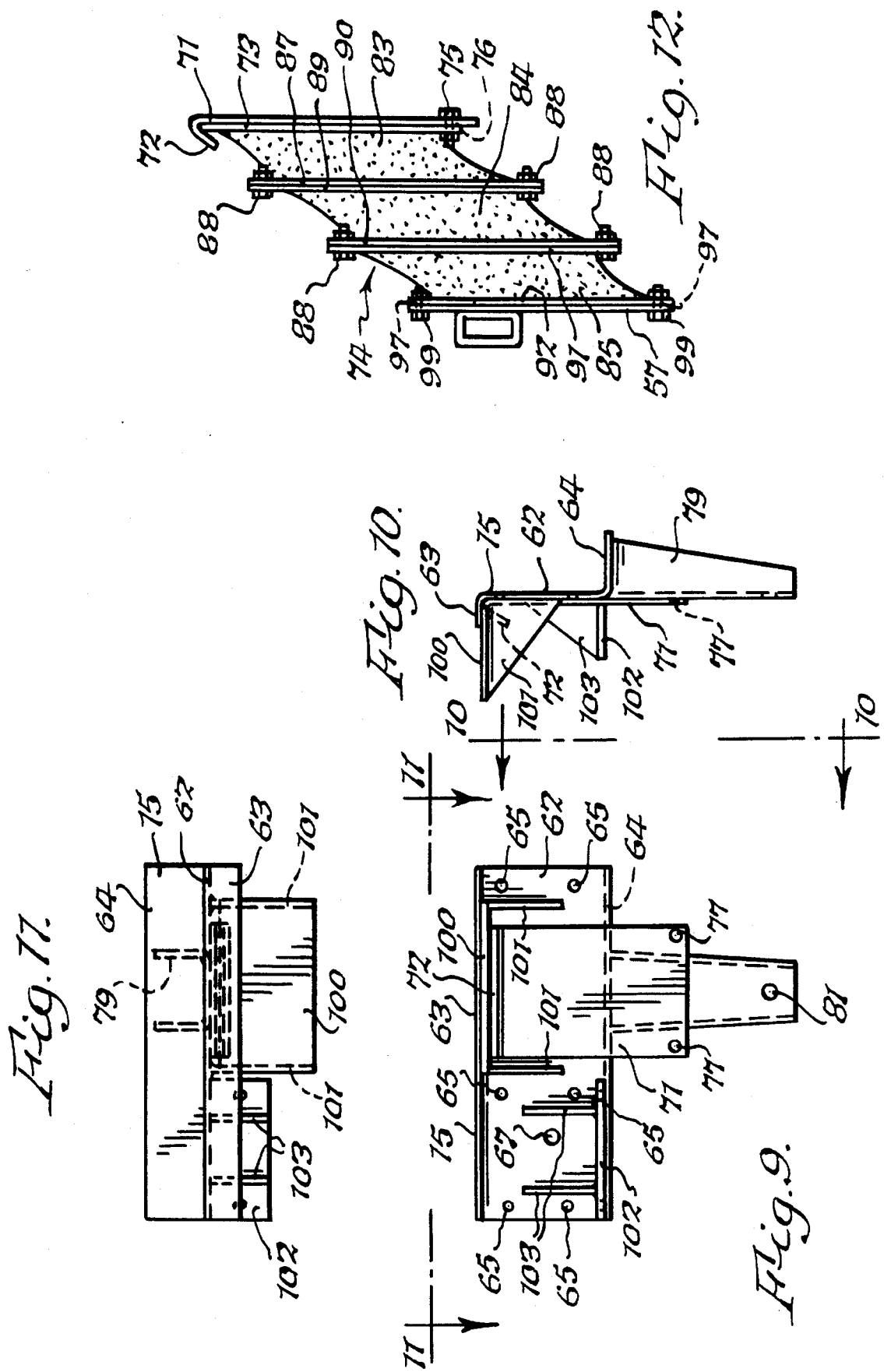

RUBBER SPRING TAG AXLE SUPENSION

BACKGROUND OF THE INVENTION

The present invention relates to a supplemental wheel assembly which can be mounted on the existing frame of a vehicle to enhance the ride thereof.

By way of background, longer bodies are being built on existing vehicle frames creating an increased overhang beyond the rear axle. In the past, supplementary supports for this overhang were in the nature of air cylinders which required compressors, numerous air lines, numerous connections and other moving parts. This required considerable maintenance from time to time. It is with overcoming the foregoing deficiency that the present invention is concerned.

SUMMARY OF THE INVENTION

It is one object of the present invention to provide a mechanical tag axle assembly which can be mounted on the existing frame of a vehicle to provide additional support thereto.

Another object of the present invention is to provide a tag axle suspension which is extremely sturdy in construction and which will enhance the ride of the vehicle.

A further object of the present invention is to provide a tag axle construction which is wholly self-contained and which can be mounted on an existing vehicle frame without removing any existing parts of the vehicle.

Yet another object of the present invention is to provide a tag axle construction which includes structure for preventing damage to the vehicle in the event of malfunction of the springs of the tag axle. Other objects and attendant advantages of the present invention will readily be perceived hereafter.

The present invention relates to a tag axle suspension for mounting on a vehicle having first and second spaced frame members, and an axle mounted between said first and second frame members, and wheels mounted at opposite ends of said axle, said tag axle suspension being fabricated for mounting behind said axle and comprising first and second front hanger assemblies attached to said first and second spaced frame members, respectively, a shaft coupled between said first and second front hanger assemblies, first and second beam assemblies having first and second ends, said first ends of said first and second beam assemblies being mounted on said shaft proximate said first and second frame members, respectively, first and second rear hanger assemblies attached to said first and second frame members, respectively, first and second rubber springs mounted on said first and second rear hanger assemblies, respectively, and attached to said second ends of said first and second beam assemblies, respectively, and a second axle attached between said second ends of said first and second beam assemblies for supporting a pair of wheels.

The present invention also relates to a tag axle comprising a front hanger having an upper portion and a lower portion, means on said upper portion for attaching said front hanger to a frame of a vehicle, means on said lower portion for supporting a shaft, an elongated arm having first and second ends, means on said first end of said arm for mounting said arm on said shaft, an axle supporting member, means mounting said axle supporting member on said second end of said arm and in perpendicular relationship thereto, a rear hanger, means for mounting said rear hanger on said frame of said vehicle, a rubber spring and means mounting said rubber spring between said rear hanger and said axle supporting member, and means on said front hanger for attaching a cross member extending perpendicularly thereto for attachment to a second front hanger spaced from said front hanger.

The various aspects of the present invention will be more fully understood when the following portions of the specification are read in conjunction with the accompanying drawings wherein:

BRIEF DESCRIPTION OF THE DRAWINGS

FIG. 2 is a fragmentary plan view of the tag axle suspension taken in the direction of arrows 2—2 of FIG. 1;

FIG. 3 is a cross sectional view taken substantially along line 3—3 of FIG. 1 and showing primarily the front hanger assembly mounting the shaft which serves as a pivot for the beam assembly;

FIG. 4 is a fragmentary cross sectional view taken substantially along line 4—4 of FIG. 3;

FIG. 5 is a view of the suspension taken substantially in the direction of arrows 5—5 of FIG. 1;

FIG. 6 is a plan view of the beam assembly;

FIG. 6a is a side elevational view of the rear plate which is welded to the arm and the axle-receiving bracket;

FIG. 6b is a side elevational view of the plate which is welded to the side of the axle-receiving bracket;

FIG. 7 is a side elevational view of the beam assembly taken substantially in the direction of arrows 7—7 of FIG. 6;

FIG. 8 is an end view of the beam assembly taken substantially in the direction of arrows 8—8 of FIG. 6;

FIG. 9 is a side elevational view of the rear hanger;

FIG. 10 is an end elevational view of the rear hanger taken substantially in the direction of arrows 10—10 of FIG. 9;

FIG. 11 is a plan view of the rear hanger taken substantially in the direction of arrows 11—11 of FIG. 9; and FIG. 12 is a side elevational view, with parts omitted, showing the rubber spring assembly mounted between the rear hanger and the beam assembly.

DESCRIPTION OF THE PREFERRED EMBODIMENTS

Figure 1:
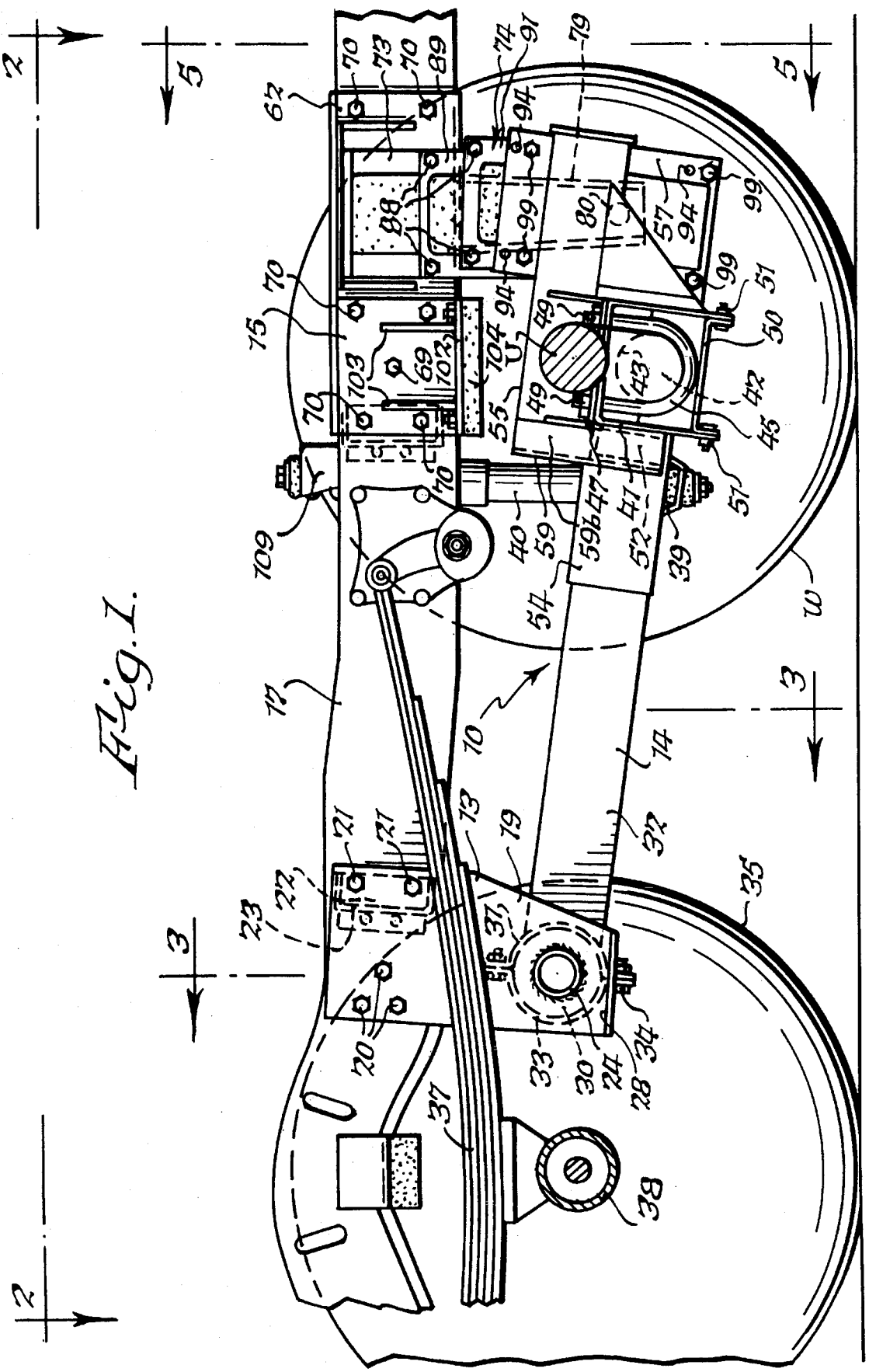
FIG. 1 is a fragmentary side elevational view, partially in cross section, taken substantially along line 1—1 of FIG. 2, and showing the tag axle suspension mounted on the frame of a motor vehicle behind the rear wheels thereof.

Summarizing briefly in advance, the tag axle suspension 10 of the present invention is an add-on to an existing vehicle, such as a motor home. In this respect, the bodies of motor homes have been made longer without lengthening the frames on which they are mounted so that there is a longer overhang beyond the rear axle. The tag axle suspension, which is mounted on the frame behind the rear axle, improves the handling stability and driving comfort and also reduces roll by providing added support to the vehicle. Additionally, the tag axle suspension has only a very few parts which are subject to wear, namely, the rubber bushings, shock absorbers and the rubber springs, thereby providing an improvement over air spring systems heretofore used.

The tag axle suspension 10 comprises two mirror-image counterpart assemblies, taken about centerline 12 of FIG. 2, and consisting of front hanger assemblies 13 and 13', beam assemblies 14 and 14', and rear hanger assemblies 15 and 15'. For the sake of simplicity of description, the structure of the tag axle suspension 10 on one side of the centerline 12 will be described with unprimed numerals and the corresponding mirror-image parts on the other side of centerline 12 will merely be designated with primed numerals without an accompanying description, it being understood that the parts designated by primed numerals are mirror-image counterparts of those described with unprimed numerals. The foregoing convention utilizing unprimed and primed numerals will also apply to the portions of the vehicle frame on which the tag axle assembly 10 is mounted.

The tag axle assembly 10 is mounted on the channel frame members 17 and 17' of the vehicle. More specifically, the front hanger assembly 13 includes a plate 19 which is bolted to frame member 17 by bolts 20 which extend through suitable holes in plate 19 and through preexisting holes in frame channel 17o Bolts 21 extend through additional holes (not numbered) which are additionally drilled in frame channel 17 and extend through holes in plate 19 and holes in plate 22 mounted at the end of cross member channel 23, which is thus bolted between frame members 17 and 17' to provide support to the frame between plates 19 and 19' which support shaft 24 which mounts beam assemblies 14 and 14'. More specifically, front hanger assembly 13 includes a box construction consisting of plate 25 which has welded to its underside plate 27 which has flange 29 welded to the bottom of plate 19 at 28. Spacers 30 are welded to the top of plate 25 and are located under the leg of frame channel 17. Plate 25 has a depending portion 26. Plate 27 and portion 26 are of the same trapezoidal shape as the lower part of plate 19. Shaft 24 is welded to plates 26, 27 and 19.

The beam assemblies 14 and 14' are pivotally mounted on shaft 24. More specifically, a rubber bushing 36 is positioned on shaft 24 between plates 26 and 27. A bracket portion 31 is welded to the end of arm 32 of the beam assembly 14. Another bracket 33 is bolted to bracket 31 by means of bolts 34. Thus, arms 32 and 32' of the beam assemblies 14 and 14', respectively, can pivot as required about shaft 24. Varying the durometer of bushing 36 varies the amount that the vehicle will roll.

In the present construction, front hanger assemblies 13 and 13' are mounted at the shown location behind the rear vehicle axle 38 which mounts wheels 35 and 35' and which is supported by leaf springs 37 and 37' mounted on frame members 17 and 17', respectively.

The beam assembly 14 (FIGS. 6, 6a, 6b, 7 and 8), as noted above, includes a rearwardly extending arm 32 which is of hollow rectangular construction. An inverted U-shape bracket 41 has its leg 53 welded to the end of arm 14, and it receives drop axle 42, the upper edge of which is received in arcuate cutouts 43 of plates 44 and a like cutout 43a (FIG. 6a) of plate 46a which is welded to tubular member 32 and across the end of bracket 41. A bracket 39 is welded to the plate 46a for supporting the lower end of shock absorber 40. A plurality of U-bolts 45 (FIG. 1) extend through holes (not shown) in the top 47 of bracket 41 and through holes 48 in straps 48a located on the top 47 of bracket 41. U-bolts 45 receive nuts 49 (FIG. 2) to secure axle 42 to bracket 41. A plate 50 (FIG. 1) is bolted to the opposite sides of bracket 41 by bolts 51 which extend through holes 46 (FIG. 8) in the legs of bracket 41 and through holes (not numbered) in the flanges of plate 50. A rectangular tubular member 52 has one end welded to arm 32, and its side is welded to leg 53 of-bracket 41. A gusset 54 is welded between arm 32 and tubular member 52. A rectangular tubular member 55 is welded across the top of tubular member 52 and the top of inverted U-shaped bracket 41. A bracket 57 having flanges 58 is welded to the inside of tubular member 55 for attachment to a rubber spring. Gusset 60 is welded between the top of inverted U-shaped bracket 41 and the side of tubular member 55. A member 59 (FIG. 6b) has its side 59a welded to the side of tubular member 52, and it has a flange 59b (FIGS. 6, 6b and 7) which wraps around onto and is welded to both the side of tubular member 55 and the end of tubular member 52 (FIGS. 6, 7 and 8). Also, gussets 61 are welded between the top of U-shaped bracket 41 and tubular member 55. Holes 56 and 58 are located in the top and sides of inverted U-shaped bracket 41 for lightening it. As can be seen from FIGS. 1 and 5, drop axle 42 has a lower portion secured to the beam assemblies 14 and 14; and it has upper portions U and U' which mounts wheels W and W'. The drop axle 42 is a conventional type of structure. It is oriented in bracket 41 by a pin 66 (FIG. 7) which passes through tubular member 55 and is received in a locating hole in the axle.

Rear hanger assemblies 15 and 15' (FIGS. 9, 10 and 11) are bolted to frame members 17 and 17', respectively. Plate 62 has an upper flange 63 and a lower flange 64. Plate 62 has holes 65 and 67 drilled therein. Hole 67 is lined up with a preexisting hole in frame member 17, and a bolt 69 (FIG. 1) is passed therethrough. This, in conjunction with flange 64 which underlies frame member 17, aligns plate 62 with frame member 17. Additional holes are drilled in frame member 17 in alignment with holes 65 and bolts 70 (FIG. 1) secure plate 62 to frame member 17. A rubber spring mounting plate 71 is welded to plate 62, and it has a hooked top 72 under which the top of a plate 73 (FIGS. 1 and 12), which is a part of rubber spring assembly 74, is positioned. The lower end of plate 73 is secured to plate 71 by a pair of bolts 75 which extend through holes 77 in plate 71 and a pair of holes 76 in spring plate 73. A tapered channel member 79 is welded to the back of plate 71 and to the underside of flange 64. A cross member tube 80 (FIGS. 2 and 5) is received in hole 81 of channel member 79 and a corresponding hole in channel member 79' and is attached therebetween by bolts 82 (FIG. 5) to provide support between the rear bracket assemblies 15 and 15'. Cross tube 80 is located on the centerline of springs 74 and 74' and it provides support to tend to prevent frame members 17 and 17' from twisting, and in addition, tends to prevent arms 14 and 14' from moving laterally.

The rubber spring 74 (FIGS. 1, 5 and 12) consists of three rubber members 83, 84 and 85 which are functionally identical. Each member is bonded to metal plates on the opposite sides thereof, as is well known. Thus, rubber member 83 is bonded between plates 73 and 87. Rubber member 84 is bonded between plates 89 ad 90, and rubber member 85 is bonded between plate 91 and plate 92. The plates are bolted together by bolts 88, as shown in FIGS. 1 and 12. The lowermost plate 92 is bolted to plate 57 at the end of beam assembly 14 by bolts 99, and plate 92 is located between flanges 58 of plate 57. Thus, rubber spring 74 is connected between the outer end of arm 32 and rear hanger assembly 15. It is to be noted that plate 57 (FIG. 7) has a set of four holes 94 and a set of four holes 95 (FIG. 7). The four bolts 99 which pass through the four holes 97 in plate 92 can either pass through the hole set 94 or the set 95. The set 94 or 95 through which they pass will determine the amount of pretensioning of spring 74. In other words, bolts 99 can optionally pass through either set of holes 94 or 95 in plate 57. A third set of holes, not shown, can also be provided in plate 57. If desired, different sets of holes can be used in plate 57 and its mirror-image counterpart on the opposite side of the vehicle to compensate for different loading on the opposite sides of the vehicle. In other words, the rubber springs 74 and 74' on opposite sides of the vehicle can be pretensioned different amounts.

The triple rubber spring 74 provides eight inches of vertical travel, which slightly exceeds the travel of the leaf-spring supported rear axle of the vehicle. This prevents the rear axle of the vehicle from being lifted off of the ground in the event that the wheels of the tag axle ride over a high member such as a curb.

A plate 100 (FIGS. 9, 10, 11) has its upper side welded to the underside of flange 63, and gussets 101 are welded between plate 100 and plate 62. As can be seen from FIG. 5, plate 100 overlies the metal plates 89 and 91 attached rubber portions 83 and 84 of rubber spring 74. Therefore, if either of the rubber portions 83 or 84 should break so that the arm 32 rises, the plates 89 and 91 will be stopped by plate 100, to thereby limit the upward pivotal movement of arm 32.

A plate 102 (FIGS. 1, 9 and 11) has its edge welded to plate 62 and a pair of gussets 103 are welded between plate 102 and plate 62. A rubber bumper 104 (FIG. 1) is attached to the underside of plate 102 to limit upward movement of arm 32. If rubber spring 74 should break or become detached, or if wheel W hits a bump with sufficient force, the upper edge of inverted U-shaped member 41 will strike bumper 104 to prevent further upward movement of arm 32.

A cross member in the form of channel 107 (FIG. 2) has its opposite ends bolted to frame members 17 and 17' by bolts 70 (FIG. 1) which pass through plate 62, frame member 17 and a plate (not shown) which is analogous to plate 22 of channel member 23, and it has upper shock absorber mounting brackets 109 and 109' welded thereon for mounting the upper ends of the shock absorbers, the lower ends of which are mounted on brackets 39 (FIGS. 1 and 7).

As can be seen from FIG. 2, the rearwardly extending arms 32 and 32' are located inwardly of the frame members 17 and 17', respectively, and the brackets 41 and 41' pass under frame members 17 and 17', respectively, and the rubber springs 74 and 74' are located outwardly of the frame members 17 and and 17', respectively. The foregoing arrangement permits installation of the tag axle assembly 10 onto an existing vehicle without interfering with the existing parts of the vehicle. More specifically, the dimensioning and configuration of the tag axle assembly causes the bracket 41 and the axle supported thereby to clear the rear shackles 37a and 37a' which supports the leaf springs.

It is to be noted that the arm 32 of the beam assembly 14, as shown in FIG. 1, is inclined rearwardly. This is the position it assumes when the vehicle frame is not supporting a vehicle body. However, when the frame is loaded with its proper weight, arm 32 will be in a substantially horizontal attitude.

While a preferred embodiment of the present invention has been disclosed, it will be appreciated that the present invention can be embodied otherwise within the scope of the following claims.

What is claimed is:

1. In a vehicle having first and second spaced frame members, an axle mounted between said first and second frame members, and wheels mounted at opposite ends of said axle, a tag axle suspension for mounting behind said axle comprising first and second front hanger assemblies attached to said first and second spaced frame members, respectively, a shaft coupled between said first and second front hanger assemblies, first and second beam assemblies having first and second ends, said first ends of said first and second beam assemblies being mounted on said shaft proximate said first and second frame members, respectively, first and second rear hanger assemblies attached to said first and second frame members, respectively, first and second rubber springs mounted on said first and second rear hanger assemblies, respectively, and attached to said second ends of said first and second beam assemblies, respectively, and a second axle attached between said second ends of said first and second beam assemblies for supporting a pair of wheels.

2. In a vehicle as set forth in claim 1 including a first cross member having opposite ends attached to said first and second frame members proximate said first and second front hanger assemblies.

3. In a vehicle as set forth in claim 2 including a second cross member having opposite ends attached to said first and second rear hanger assemblies.

4. In a vehicle as set forth in claim 3 including a third cross member having opposite ends attached to said first and second frame members proximate said first and second rear hanger assemblies, and first and second shock absorbers attached between said third cross member and said second ends of said first and second beam assemblies, respectively.

5. In a vehicle as set forth in claim 1 including a cross member having opposite ends attached to said first and second frame members proximate said first and second rear hanger assemblies, and first and second shock absorbers attached between said cross member and said second ends of said first and second beam assemblies, respectively.

6. In a vehicle as set forth in claim 5 including a second cross member having opposite ends attached to said first and second rear hanger assemblies.

7. In a vehicle as set forth in claim 1 wherein said first and second front hanger assemblies each comprise first and second plates, respectively, having upper and lower portions, bolts attaching said upper portions of said first and second plates to said first and second frame members, respectively, said shaft being attached to said lower portions of said first and second plates, first and second rubber bushings mounted on said shaft proximate said lower portions of said first and second plates, and first and second brackets mounting said first ends of said first and second beam assemblies to said first and second rubber bushings, respectively.

8. In a vehicle as set forth in claim 7 wherein said first and second beam assemblies comprise first and second tubular members, respectively, having first and second ends, respectively, first and second axle supporting members extending perpendicularly outwardly from said second ends of said first and second tubular members, respectively, and outer ends on said first and second axle supporting members attached to said first and second rubber springs.

9. In a vehicle as set forth in claim 8 wherein said first and second tubular members are located inwardly of said first and second frame members, respectively, and wherein said first and second axle supporting members are located underneath said first and second frame members, respectively, and wherein said first and second rubber springs are located outwardly of said first and second frame members, respectively.

10. In a vehicle as set forth in claim 9 including a cross member having opposite ends attached to said first and second frame members proximate said first and second rear hanger assemblies, first and second upper shock absorber attachment brackets attached to said cross member proximate said first and second rear hanger assemblies, respectively, first and second lower shock absorber attachment brackets attached to said first and second beam assemblies, respectively, and first and second shock absorbers having upper ends attached to said first and second upper shock absorber attachment brackets, respectively, and having lower ends attached to said first and second lower shock absorber attachment brackets, respectively.

11. In a vehicle as set forth in claim 10 including first and second abutment plates extending outwardly from said first and second frame members, respectively, above said first and second rubber springs, respectively, for limiting upward movement of said first and second beam assemblies, respectively, in the event of malfunction of said first and second rubber springs, respectively.

12. In a vehicle as set forth in claim 11 including third and fourth abutment plates attached to said first and second frame members, respectively, for limiting upward movement of said first and second beam assemblies.

13. In a vehicle as set forth in claim 1 including a cross member having opposite ends attached to said first and second rear hanger assemblies.

14. In a vehicle as set forth in claim 1 including first and second abutment means attached to said first and second frame members, respectively, for limiting upward movement of said first and second beam assemblies, respectively.

15. In a vehicle as set forth in claim 1 including first and second axle supporting members extending perpendicularly outwardly from said second ends of said first and second beam assemblies, respectively, said first and second axle supporting members passing under said first and second frame members, respectively, and first and second means mounted on said first and second frame members, respectively, above said first and second axle supporting members, respectively, for limiting upward movement of said first and second beam assemblies, respectively.

16. In a vehicle as set forth in claim 15 including third and fourth means mounted on said first and second frame members, respectively, above said first and second rubber springs, respectively, for limiting upward movement of said first and second beam assemblies, respectively.

17. In a vehicle as set forth in claim 1 wherein said first and second beam assemblies comprise first and second tubular members, respectively, having first and second ends, respectively, first and second axle supporting members extending perpendicularly outwardly from said second ends of said first and second tubular members, respectively, and outer ends on said first and second axle supporting members attached to said first and second rubber springs.

18. In a vehicle as set forth in claim 17 wherein said first and second tubular members are located inwardly of said first and second frame members, respectively, and wherein said first and second axle supporting members are located underneath said first and second frame members, respectively, and wherein said first and second rubber springs are located outwardly of said first and second frame members, respectively.

19. In a vehicle as set forth in claim 18 including a cross member attached between said first and second rear hanger assemblies.

20. In a vehicle as set forth in claim 19 including a second cross member attached between said first and second frame members proximate said second ends of said first and second beam assemblies.

21. In a vehicle as set forth in claim 20 including first and second shock absorbers mounted between said first and second beam assemblies, respectively, and said second cross member.

22. A tag axle comprising a front hanger having an upper portion and a lower portion, means on said upper portion for attaching said front hanger to a frame of a vehicle, means on said lower portion for supporting a shaft, an elongated arm having first and second ends, means on said first end of said arm for mounting said arm on said shaft, an axle supporting member, means mounting said axle supporting member on said second end of said arm and in perpendicular relationship thereto, a rear hanger, means for mounting said rear hanger on said frame of said vehicle, a rubber spring, means mounting said rubber spring between said rear hanger and said axle supporting member, said elongated arm comprising a tubular member, said front hanger comprising a first plate, said rear hanger comprising a second plate, said axle supporting member comprising a channel-shaped member, means in said channel-shaped member for attachment to an axle, said means mounting said rubber spring comprising a second tubular member mounted on said channel-shaped member, and a plate on said second tubular member attached to said rubber spring.

23. A tag axle as set forth in claim 22 including a third tubular member attached to both said tubular member and said channel-shaped member.

24. A tag axle as set forth in claim 23 wherein said second tubular member has an end attached to said third tubular member, and wherein said second tubular member is located above said third tubular member and said channel-shaped member.

25. In a vehicle having first and second spaced frame members, an axle mounted between said first and second frame members, and wheels mounted at opposite ends of said axle, a tag axle suspension for mounting behind said axle comprising first and second front hanger assemblies, means attaching said first and second front hanger assemblies to said first and second spaced frame members, respectively, a shaft, means coupling said shaft between said first and second front hanger assemblies, first and second beam assemblies having first and second ends, means pivotally mounting said first ends of said first and second beam assemblies on said shaft proximate said first and second frame members, respectively, first and second rear hanger assemblies, means attaching said first and second rear hanger assemblies to said first and second frame members, respectively, first and second rubber springs, means mounting said first and second rubber springs on said first and second rear hanger assemblies, respectively, means attaching said first and second rubber springs to said second ends of said first and second beam assemblies, respectively, a second axle, and means attaching said second axle between said second ends of said first and second beam assemblies for supporting a pair of wheels.

* * * * *